United States Patent [19]

Rauner et al.

[11] 4,057,595
[45] Nov. 8, 1977

[54] METHOD OF MODIFYING THE PHYSICAL PROPERTIES OF URETHANE ELASTOMERS

[75] Inventors: Lawrence A. Rauner; Joseph A. Colquhoun, both of Midland, Mich.

[73] Assignee: Dow Corning Corporation, Midland, Mich.

[21] Appl. No.: 578,562

[22] Filed: May 19, 1975

[51] Int. Cl.$^2$ ............................................. C08L 83/06
[52] U.S. Cl. .......................... 260/824 R; 260/77.5 SP
[58] Field of Search ................................... 260/824 R

[56] References Cited

U.S. PATENT DOCUMENTS

| | | | |
|---|---|---|---|
| 3,243,475 | 3/1966 | Reischl et al. | 260/824 R |
| 3,246,048 | 4/1966 | Haluska | 260/824 R |
| 3,306,869 | 2/1967 | Lahr | 260/824 R |
| 3,342,766 | 9/1967 | Huntington | 260/824 R |
| 3,356,758 | 12/1967 | Omietanski | 260/824 R |
| 3,480,583 | 11/1969 | Bailey et al. | 260/824 R |
| 3,526,651 | 9/1970 | Rossmy et al. | 260/824 R |
| 3,532,732 | 10/1970 | Rossmy et al. | 260/824 R |
| 3,555,063 | 1/1971 | Nakajima | 260/824 R |
| 3,565,845 | 2/1971 | Johnson | 260/824 R |
| 3,567,499 | 3/1971 | Klebert | 260/824 R |
| 3,600,418 | 8/1971 | Bailey et al. | 260/824 R |
| 3,629,310 | 12/1971 | Bailey et al. | 260/824 R |

*Primary Examiner*—Paul Lieberman
*Attorney, Agent, or Firm*—Robert L. McKellar

[57] ABSTRACT

A method of modifying the physical properties of urethane elastomers so that the properties of the urethane are enhanced.

The method involves reacting a specific siloxane-polyoxyalkylene into a urethane elastomer.

14 Claims, No Drawings

METHOD OF MODIFYING THE PHYSICAL PROPERTIES OF URETHANE ELASTOMERS

The emergence of the elastomeric urethane market over the past few years had been due to the fact that the urethanes have desirable properties that cannot be found in other curable polymeric materials.

These properties include toughness, abrasion resistance, flexibility, moldability, fast cure times, inexpensive precursor reactants and the ability to be milled, machined and extruded in their cured state.

The properties for the most part are determined by the choice of the basic polymers in the curable urethanes, the type of curing and crosslinking systems used and the presence or absence of certain additives.

The urethane elastomers themselves are prepared from reactive polymers such as polyethers and polyesters and isocyanate functional organic compounds. A typical example is the reaction product of a dihydroxy functional polyether and/or a trihydroxy functional polyether with toluene diisocyanate such that all of the hydroxy is reacted to form urethane linkages leaving isocyanate groups for further reaction. This type of reaction product is termed a prepolymer which may cure by itself on exposure to moisture or by the stoichiometric addition of polycarbinols or other polyfunctional reactive materials which react with isocyanates.

The urethane elastomers are commercially prepared having various ratios of isocyanate compounds and polyethers or polyesters.

The most common of the urethane elastomers are those containing hydroxyl functional polyethers or polyesters and, low molecular weight polyfunctional, polymeric isocyanates.

Another common material for use with hydroxyl functional polyethers and polyesters is toluene diisocyanate.

In this specification, the terms "urethane" and "urethane elastomer" are considered as having essentially the same meaning.

Additional information on such urethane materials can be found in Golding, *Polymers and Resins*, Van Nostrande, 1959, pages 325 et seq. and Saunders and Frisch, *Polyurethanes, Chemistry and Technology*, Part II, Interscience Publishers, 1964, among others.

This invention is directed to the enhancement of the elongation, flexibility and abrasion resistance properties of urethane elastomers.

With this invention, manufacturers of urethane based products will be able to enlarge the types of products they can produce. They will also be able to enhance the properties of existing urethane products. One such existing use would be in enhancing the abrasion resistance of urethanes used in drum blades for photoreceptor drums in photocopying machines.

Another such intended use of this invention is, for example, the production of gears for snowmobiles, from polyurethanes. Because snowmobiles almost always operate during the coldest months of the year, and since the gears are presently made out of cured urethane elastomers that have some degree of low temperature capability, it is conceivable that longer lasting, tougher, more flexible and elastic gears could be made by the incorporation of this invention in the manufacture of such parts.

A third such use would be the inclusion of these inventive compositions to prevent anti-blocking in the production and storage of Spandex fibers. It is a familiar concept that when one incorporates an essentially linear polymer into a three-dimensional crosslinked polymer system, the linear polymer lends the properties it possesses to the three-dimensional polymer.

For example, the introduction of linear polysiloxanes into a three-dimensional polymer tends to soften the three-dimensional polymer. This softening manifests itself in the physical properties, in that, the elongation increases, tear decreases and tensile strength drop off drastically.

This phenomena is due mainly to the plasticization effect on the linear polysiloxanes.

Because of the need to have some softening in three-dimensional polymers for some uses, those in the art have added small amounts of siloxanes and found that there are decided disadvantages in this particular approach.

Generally, the siloxanes that give the desired effects, i.e., more flexibility, also give the polymers decreased tear strengths and decreased tensile strengths.

Generally, the siloxanes exude to the surface of the urethane elastomer and are removed from the cured urethane thus causing the urethane to "dry up", i.e., become brittle during use.

Further, the siloxanes tend to exude to the surface of the urethane elastomer and cause a build-up on the surface of molds and machinery used in the manufacturing process.

Further, the siloxanes tend to build-up on the surface of the manufactured parts and render them nonpaintable.

Thus, the inclusion of siloxanes in elastomers has many disadvantages and the tendency in the art has been to exclude such additives.

There now has been found a method for modifying the low temperature properties of urethane elastomers, whereby the beneficial properties of the siloxanes are retained without sacrificing the typical urethane properties.

Thus, it is an object of this invention to provide a method of modifying properties of urethane elastomers.

It is also an object of this invention to provide a composition which enhances the desirable low temperature properties of urethane elastomers.

It is another object of this invention to provide cured urethane products with long lasting properties.

It is a further object of this invention to provide the manufacturer with a method of manufacturing quality products with desirable low temperature properties.

It is still another object of this invention to allow the manufacture of quality products whose desirable physical properties are retained while optimum low temperature properties are obtained.

It is yet another object of this invention to provide Spandex fibers with anti-blocking properties.

It has now been found that the use of certain specifically defined, reactive, siloxane-polyoxyalkylene copolymers as additives to curable urethane elastomers gives the resulting cured urethane modified properties while the disadvantages of such similar additives are not experienced.

The inventive additives do not exude to the surface and cause a build-up of the additive material anywhere that it is detrimental.

The inventive additives have long lasting effects and thus the enhanced properties of the urethane elastomer are long lasting.

The objects of this invention are met by utilizing the method and compositions of this invention which method consists of preparing a cured urethane polymer which method consists of (I) introducing into an uncured urethane polymer from 5.1 to 36 weight percent, based on the weight of the uncured urethane polymer and siloxane-polyoxyalkylene copolymer, of a siloxane-polyoxyalklene copolymer selected from the group consisting of

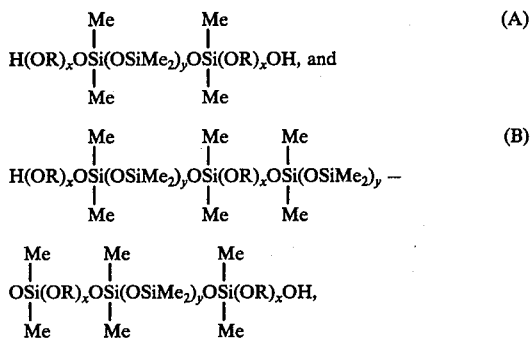

wherein each $x$ has an average value of 3 to 45, each $y$ has an average value of 8 to 198, Me is a methyl radical, wherein $+OR+$ is a polyoxyalkylene polymer or copolymer wherein R is composed of ethylene radicals or butylene radicals and mixtures of ethylene or butylene radicals with propylene radicals, the amount of ethylene or butylene radicals relative to the propylene radicals being such that the ratio of carbon atoms to oxygen atoms in the total $+OR+$ block ranges from 2.0/1 to 2.9/1, (II) curing the urethane polymer whereby the siloxane-polyoxyalkylene copolymer is reacted into the urethane polymer, thereby modifying the physical properties of the urethane polymer.

The siloxane-polyoxyalkylene copolymers of this invention are known materials. Their preparation and the preparation of the urethane elastomers can be found described in the copending application entitled "A Method of Obtaining Release of Polyurethane Polymers and Composition Therefore", by Joseph A. Colquhoun and John G. Uhlmann, filed on even date herewith. The materials and preparations therein are incorporated herein by reference.

The usual method of this invention is to add the reactive siloxane-polyoxyalkylene copolymer to the uncured urethane polymer just prior to cure.

Since the siloxane-polyoxyalkylene copolymer itself is reactive towards isocyanates, it causes the urethane polymer to react with it and, therefore, it usually is not added until just prior to the cure reaction of the urethane polymer.

On the other hand, it is within the scope of this invention to incorporate the siloxane-polyoxyalkylene into the reactive polyurethane prepolymer and then eventually react the prepolymer with a crosslinker or curing agent to obtain the final product, the cured urethane polymer.

The manner of addition of the siloxane-polyoxyalkylene compositions of this invention to the uncured urethane polymer is not critical, that is, they can just simply be stirred in, dispersed or mixed through a mixing head at high pressure. The method is immaterial as long as the siloxane-polyoxyalkylene compositions of this invention are evenly dispersed throughout the curable urethane polymer.

The uncured urethane polymer is thereafter cured either with or without the aid of a catalyst or with or without the aid of increased temperatures.

An important aspect of this invention is the reactive siloxane-polyoxyalkylene copolymer.

There are, in fact, several critical aspects to the invention which those skilled in the art must pay heed to.

The most important aspect of this invention is the fact that the siloxane-polyoxyalkylene copolymer of this invention is reactive with the uncured urethane polymer.

The siloxane-oxyalkylene copolymers of this invention contain primary hydroxyl groups on their terminal ends. These primary hydroxyl groups react with the polyurethane polymers spontaneously at room temperature and, therefore, usually do not need catalysts.

Therefore, no special circumstances are required in order to react the copolymer with the polyurethane polymer. It is possible that the difunctional siloxane-polyoxyalkylene can be substituted for part of the carbinol curing agents in most systems.

The siloxane-polyoxyalkylene copolymer has to be at least difunctional, that is, the preferred siloxane-polyoxyalkylene copolymers of this invention are usually difunctional but also contain a small amount of a branched species which is inherently present due to the way the precursors of the siloxane-polyoxyalkylene copolymers are prepared, thus, small amounts of multi-functional siloxane-polyoxyalkylene copolymers, present in the essentially linear siloxane-polyoxyalkylene, can be tolerated and are within the scope of this invention. Such "smaller amounts" of branched species means less than 0.1 weight percent based on the weight of the siloxane-polyoxyalkylene copolymer.

Of equal importance is the presence or absence of unreacted species in the final product of siloxane-polyoxyalkylene copolymer. It is very important that nearly all species in the final product be at least difunctionally reactive. That is, no or essentially no monofunctional material should be present as such material detracts from the physical properties of the final cured urethane elastomer. When reactivity is discussed in this specification, the term has a limited meaning, that is, it refers only to those functional groups which are reactive with the isocyanate groups of the uncured urethane polymer. The "urethane-reactive functional group" for purposes of this invention refers generally to primary hydroxyl groups on carbon, i.e., $CH_2OH$.

The physical properties of the cured urethane polymer can be affected deleteriously in several ways by the inclusion of the monofunctional material in the siloxane-polyoxyalkylene copolymer described below. First, the monofunctional material is generally capped on one end by hydroxy (the functional end) and on the other end by an unsaturated group (the non-functional end). The hydroxy end reacts with the isocyanate of the uncured urethane polymer and in effect endblocks such polymer, thus, reducing the chain extension and crosslinking of the urethane polymer. Secondly, the monofunctional material which remains unreacted acts as a plasticizer in the cured polyurethane polymer and, in effect, reduces the physical properties.

Previous release materials for these urethanes have, in fact, caused the same alteration in physical properties as just described and, therefore, preventing such loss of properties by using the inventive compositions is an advance in the art.

The reaction used for preparing the siloxane-polyoxyalkylene copolymer is also important. Thus, any reaction which causes the presence of the monofunctional species is not applicable in the instant invention.

By way of example, there is a well-known reaction whereby the siloxane-polyoxyalkylene copolymers are prepared that are analogous in structure to the instant siloxane-polyoxyalkylene copolymers except that they have Si—C bonds connecting the siloxane and the polyoxyalkylene blocks while the instant invention has siloxane-polyoxyalkylene blocks linked by Si—O—C bonds.

This reaction is

This reaction never goes to 100 percent completion and so there is always present a portion of the monofunctional species, i.e., C═CC—OH which, as indicated above, gives rise to loss of physical properties when incorporated in a cured urethane polymer.

In contrast, the reaction used to prepare the siloxane-polyoxyalkylene copolymers of the instant invention can be illustrated generally as

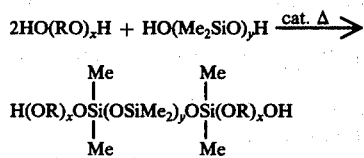

and the composition (B) noted above, where the catalyst is any acid condensation catalyst which is not a strong rearranging catalyst such as dodecylbenzenesulphonic acid, toluene sulphonic acid or the like.

The typical reaction would include the reaction of dihydroxy functional polyesters and dihydroxy functional linear siloxanes in a solvent solution (preferably toluene), at 40 to 75% solids, under the influence of a condensation catalyst at the reflux temperature of the mixture for several hours.

The reflux temperature ranges from 80° to 130° C. depending on the reactants, type of solvent and quantity of solvent present.

The reflux time can vary from 3 to 15 hours wherein the time is dependent on the amount of water of reaction that is removed. 100% of the water of reaction should be removed and it is accomplished within the 3 to 15 hour time span. Preferably, the reaction is run from 4 to 10 hours for the most benefits to be derived from the reaction, such as cost factors, etc.

The mole ratio of the carbinol of the starting polyether to the silanol of the starting linear polydimethylsiloxane is important. For purposes of this invention, the ratio should be 2/1 to 0.5/1.

Because of the fact that the precursor, linear polydimethylsiloxanes react faster than the carbinols under the influence of the condensation catalysts, this invention also includes siloxane-polyoxyalkylene copolymers having an ABABABA type of structure, i.e., where two ABA type of copolymers are connected together by a difunctional siloxane unit.

Such a material can be, for instance,

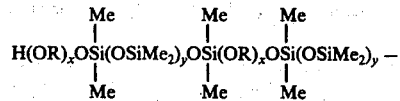

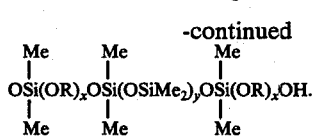

The chances of arriving at the ABABABA type of molecule are greater when the mole ratio of total carbinol to total silanol is in favor of the silanol, that is, the closer one moves to the ratio of 0.5/1, the greater are the chances that the ABABABA type of polymer will be formed.

Because of the fact that the precursor, linear polydimethylsiloxane is subject to self-condensation under the influence of condensation catalysts, this invention includes siloxane-polyoxyalkylene copolymers wherein the molecular weight of the siloxane portion of the final copolymer is greater than the molecular weight of the precursor, linear polydimethylsiloxane. That is, the value of $y$ in the final product is 8 to 198.

It is important to note that both the starting materials are at least difunctional. There are at least two reasons for this. First, if the polyether does not react 100% with the polysiloxane, any remaining material is still difunctional. Thus, one prevents the presence of any monofunctional materials and, hence, the reduction of physical properties in the final cured urethane polymer is not observed.

Secondly, the fact that the polyether is difunctional guarantees that the chances of being reacted with the polysiloxane are much greater than if the polyether was only monofunctional.

The third important aspect of this invention is the fact that the polyethers of this invention used to make the siloxane-polyoxyalkylene copolymer are special polyethers, that is, even though the scope of the invention includes polymers of ethylene, propylene and butylene oxides and copolymers thereof, it is imperative that such polymers and copolymers have primary hydroxyl groups as the functional group. This is in contrast to the secondary hydroxyls that are usually found in polymers and copolymers containing propylene oxide. Naturally, the straight ethylene and butylene oxide based polyethers already have primary hydroxyl groups and need no further treatment. The copolymers which contain propylene oxide have to be endblocked with small amounts of ethylene oxide or butylene oxide in order to furnish primary hyroxyls to the copolymer. Such materials are commercial products and one common example is the Plutonic ® line of polyethers produced by BASF-Wyandotte, Wyandotte, Michigan. Typical materials under that tradename include L31, L61, and L81.

The use of these special primary hydroxylated polymers and copolymers is necessary so that the reaction between the polyether carbinol and the polysiloxane silanol is easier to effect. Primary carbinols react much more readily than secondary carbinols. A second reason is that these carbinols react more readily with the urethane system, thus, insuring that the siloxane-polyoxyalkylene is also reacted into that system.

For purposes of this invention, the polyethers that are the precursors for the siloxane-polyoxyalkylene copolymer can be derived from polyoxyethylene, polyoxybutylene or copolymers of polyoxyethylene, polyoxybutylene and polyoxypropylene. The precursor polyethers have molecular weights within the range of 200 to 2000 and when the polyether is composed of propylene radicals and radicals selected from the group consisting of ethylene and butylene radicals, the amount of propylene radicals relative to the other alkylene radicals should be such that the ratio of carbon atoms to oxygen atoms in the total polyether ranges from 2.0/1 to 2.9/1. This allows for up to 90% propylene oxide copolymerized with ethylene oxide and up to 5% butylene oxide copolymerized with the propylene oxide. This definition includes copolymers of ethylene oxide and butylene oxide and homopolymers of both ethylene oxide and butylene oxide.

Of further importance in the use of the siloxane-polyoxyalkylene copolymers is the fact that they must be esentially linear. If they are branched or have multi-functionality, they tend to crosslink and make undesirable cures in the cured urethane polymers. Thus, the preferred siloxane-polyoxyalkylene materials are essentially linear.

The polysiloxanes which are the precursors to the siloxane-polyoxyalkylene are generally those considered to be low molecular weight, that is, they have molecular weights ranging from about 750 to 3700. The polysiloxanes of this invention are essentially linear, hydroxy endblocked polydimethylsiloxane fluids. The molecular weight of these polydimethylsiloxanes of 750 to 3700 is based on the average molecular weight and thus, various methods may be used to arrive at the average molecular weight such as blending siloxanes so that the average molecular weight falls in the range of 750 to 3700.

As indicated earlier, the siloxanes are essentially linear, however, siloxanes containing a small amount of branch points and slightly more than an average of two equivalents of silanol per molecule are within the scope of this invention.

The polysiloxane precursor and the polyether precursor are mixed together, in solvent, and then catalyzed with a non-rearranging acid catalyst.

The siloxane and polyether is mixed in the ratio of total moles of carbinol to total moles of silanol of from 2/1 to 0.5/1.

This range of ratios gives the optimum property alteration and involves a total siloxane content of 30 to 85 weight percent in the copolymer based on the total weight of polyether and siloxane in the copolymer.

Higher ratios than 2/1 gives a big excess of glycol which is not desirable because the siloxane effect is diluted and a ratio of less than 0.5/1 gives a high silanol content which is also undesirable because the information of very high molecular weight siloxanes is enhanced.

After the addition of the catalyst, the reactants are stirred and heated for several hours, cooled, stripped under vacuum to remove the solvent, neutralized with Ca(OH)$_2$ or NaHCO$_3$ or the like and then filtered.

The resulting product may or may not be turbid depending on the ratio of polyether to siloxane, the molecular weight of each, and the type of polyether.

The fact that the product is not wholly compatible is not indicative of the performance of the product. The materials which appear both clear and turbid at 100% solids function in this invention equally well.

The reactive siloxane-polyoxyalkylene is then added to the curable urethane polymer and allowed to react into the urethane polymer. No special conditions are required to effect this reaction.

The reactive siloxane-polyoxyalkylene copolymer is added to the reactive urethane polymer in a quantity 5.1 to 36 weight percent based upon the weight of the total copolymer-urethane system.

The most beneficial range for the copolymer in this invention is about 6 to 15 weight percent based on the weight of the total siloxane-polyoxyalkylene/reactive urethane system. The preferred range is 8.0 to 12.0 percent.

The following examples are illustrative only and should not be construed as limiting the invention.

EXAMPLE 1

Into a 2 l., 3-necked flask was placed 112 gms. of a hydroxyl endblocked polydimethylsiloxane having a silanol content of 3.9 weight percent and 11.8 (Me$_2$SiO) units, 112 gms. of another polysiloxane having 33.4 (Me$_2$SiO) units and a hydroxyl content of 1.37 weight percent, 225 gms. of a polyether having the formula HO(CH$_2$CH$_2$O)$_{14}$H and 400 gms. of toluene.

The mixture was heated ½ hour to reflux and then 0.25 gms. of dodecylbenzenesulphonic acid in toluene was added. The mixture was heated for 3 hours and then 2 gms. of Ca(OH)$_2$ was added. When it was cooled, it was filtered and stripped to yield a fluid siloxane-polyoxyalkylene copolymer of this invention having a viscosity of 720 cs. at 25° C.

A urethane prepolymer was prepared in the following manner:

To a clean 1 liter, 3-necked flask was charged 104 gms. of toluene diisocyanate. The flask was equipped with a stirrer, thermometer and a water cooled condenser surmounted by a CaCl$_2$ drying tube. To this was added a mixture of 82 gms. of a trihydroxy functional polyether of 440 molecular weight and 42 gms. of a dihydroxy functional polyether of 410 molecular weight in a dropwise fashion. The solvent was introduced with the toluene diisocyanate and was a mixture of 76 gms. of cellosolve acetate and 76 gms. of dry xylene.

The mixture was heated and agitated for 2½ hours while the temperature rose from 50° to 125° C. The product was clear and yellow in color. It was cooled.

The prepolymer and the siloxane-polyoxyalkylene prepared above were mixed together in the following proportions so that the siloxane-polyoxyalkylene could be evaluated.

| Sample No. | 1 | 2 | 3 | 4 | 5 | 6 | 7 |
|---|---|---|---|---|---|---|---|
| Gms. of Siloxane-polyoxyalkylene | 0 | 0.5 | 1 | 1.5 | 2 | 3 | 4 |
| Gms. of Urethane Polymer at 60% Solids in Solvent | 12 | 12 | 12 | 12 | 12 | 12 | 12 |
| % of Siloxane-polyoxyalkylene in the Composition | 0 | 6.6 | 12.2 | 17.2 | 24.4 | 29.4 | 35.8 |

The above materials containing the various quantities of siloxane-polyoxyalkylene copolymer were each painted onto aluminum 3 × 9 inch panels and allowed to cure overnight at room temperature. They were then cured at 50% relative humidity and 72° F. for one week.

Because some time elasped between curing and testing, the samples were conditioned at 50% relative humidity and 72° F. overnight before testing.

Samples of the cured urethane were subjected to an abrader to determine the abrasion resistance of the materials.

The abrading test was run on a Taber abraser under ASTM test D1044 at 60 r.p.m. using a CS10 type wheel.

The apparatus is manufactured by Taber Instruments, North Tonawanda, New York.

The apparatus carried a ½ kilogram weight on the abrading arm and the test was run for 500 revolutions. The results were as follows:

| Sample No. | p.s.i. Tensile at Yield | % Elongation at Yield | psi Tensile at Rupture | % Elongation at Rupture | Modulus × $10^3$ |
|---|---|---|---|---|---|
| 1 | 1883 | 20 | 3108 | 111 | 5.18 |
| 2 | 1683 | 26.7 | 2623 | 122 | 4.52 |
| 3 | 1875 | 25 | 2225 | 140 | 4.42 |
| 4 | 1165 | 30 | 2770 | 149 | 2.29 |
| 5 | 1167 | 26.7 | 2218 | 152 | 2.24 |
| 6 | 1742 | 31.6 | 2617 | 158 | 4.17 |
| 7 | 890 | 37.5 | 2240 | 205 | 1.33 |

| Sample No. | Loss by Abrasion in Gms. | % Loss From Original Sample |
|---|---|---|
| 1 | −.0130 | −0.540 |
| 2 | −.0095 | −0.360 |
| 3 | −.0084 | −0.310 |
| 4 | −.0013 | −0.046 |
| 5 | −.0001 | −0.004 |
| 6 | .0000 | 0.000 |
| 7 | −.0038 | −0.140 |

EXAMPLE 2

Into a 5 l., 3-necked flask was placed 1125 gms. of a hydroxy endblocked polydimethylsiloxane having 3.9 weight percent of silanol and 11.8 units of ($Me_2SiO$), 1125 gms. of a polyether having the formula $HO(CH_2CH_2O)_{13.5}H$ and 1500 gms. of toluene. The flask was equipped similar to the flask in the siloxane-polyoxyalkylene copolymer preparation of Example 1. The mixture was heated to 45° C. and 1 gm. of dodecylbenzene sulphonic acid in toluene was added. The mixture was heated to reflux and maintained for 5½ hours.

Five gms. of $Ca(OH)_2$ was added, the material cooled and filtered. It was stripped to 150° C. at less than 5 mm. The resulting siloxane-polyoxyalkylene copolymer had a viscosity of 516 cs., flash of 370° F., sp. gravity of 1.055, refractive index at 20° of 1.4379.

A urethane polymer was prepared as in Example 1 and the above prepared siloxane-polyoxyalkylene was evaluated as follows:

| Sample No. | Gms. of Siloxane-polyoxyalkylene copolymer | Gms. of Urethane Polymer at 60% Solids | % Siloxane-polyoxyalkylene |
|---|---|---|---|
| 1 | 0 | 12 | 0 |
| 2 | 0.5 | 12 | 6.6 |
| 3 | 1 | 12 | 12.2 |
| 4 | 1.5 | 12 | 17.2 |
| 5 | 2 | 12 | 24.4 |
| 6 | 3 | 12 | 29.4 |
| 7 | 4 | 12 | 35.8 |

The urethane polymers and the siloxane-polyoxyalkylene copolymer was mixed and air dried at room temperature for 1 week. The mixtures were then cured at 50% relative humidity and 72° F. for one week.

Tensile bars were cuts from the dried and cured films and the following properties were taken on a Monsanto tensionmeter:

EXAMPLE 3

A siloxane-polyoxyalkylene copolymer analogous to Example 1 was prepared according to the method of Example 1 except only 112 gms. of the first polysiloxane were employed, 112 gms. of the second polysiloxane were employed, 225 gms. of the polyether and 300 gms. of toluene were employed.

The reaction was run for 5 hours at reflux after the dodecylbenzenesulphonic acid was added. It was cooled and treated with 2 gms. of $Ca(OH)_2$, filtered and then stripped at 150° C. at a reduced pressure. It was clear and water-white and had a viscosity of 785 cs. at 25° C.

The siloxane-polyoxyalkylenes of this example were mixed with the urethane polymer of the above example and evaluated.

| Sample No. | % Siloxane-polyoxyalkylene | p.s.i. Tensile at Yield | % Elongation at Yield | psi Tensile at Rupture | % Elongation at Rupture |
|---|---|---|---|---|---|
| 1 | 0 | 2142 | 20 | 3025 | 84 |
| 2 | 6.6 | 1700 | 25 | 2450 | 99 |
| 3 | 12.2 | 1050 | 30 | 2300 | 115 |
| 4 | 17.2 | 1400 | 28 | 2485 | 122 |
| 5 | 24.4 | 1610 | 30 | 2750 | 128 |
| 6 | 29.4 | 1570 | 35 | 2630 | 150 |
| 7 | 35.8 | 473 | 30 | 2550 | 144 |

EXAMPLE 4

The addition of the siloxane-polyoxyalkylene copolymers of this invention to a Spandex fiber prepolymer gives the finished Spandex fiber pronounced anti-blocking properties. Blocking is the term used to describe the tendency of the individual fibers of Spandex to stick together when wound onto a spindle.

A siloxane-polyoxyalkylene copolymer prepared from 55 weight percent of a hydroxyl endblocked polydimethylsiloxane having a silanol content of 3.9 weight percent and 11.8 ($Me_2SiO$) units and 45 weight percent of a polyether having the formula $HO(CH_2CH_2O)_{13.5}H$ was reacted into a Spandex fiber in the amount of 5 weight percent of the siloxane-polyoxyalkylene and Spandex fiber, the Spandex fiber did not block and the characteristic properties of the Spandex were not altered significantly.

The Spandex fiber or material as referred to herein is, as defined by the Federal Trade Commission under the Textile Fiber Products Identification Act of 1960, a manufactured fiber in which the fiber forming substance is a long chain synthetic elastomer comprised of at least 85 weight percent of a segmented polyurethane. Spandexes are well known in the art and are described in detail in numerous places in the literature and thus will not be further discussed here.

That which is claimed is:

1. A method of modifying the physical properties of urethane elastomers which method consists of (I) introducing into an uncured urethane elastomer from 5.1 to 36 weight percent, based on the weight of the urethane and siloxane-polyoxyalkylene copolymer, a siloxane-polyoxyalkylene copolymer selected from the group consisting of

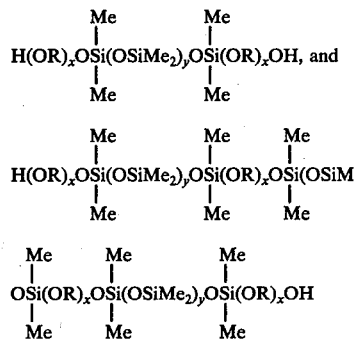

wherein each $x$ has an average value of 3 to 45, each $y$ has an average value of 8 to 198, Me is a methyl radical, wherein $+OR+_x$ is a polyoxyalkylene polymer or copolymer wherein R is composed of ethylene radicals or butylene radicals and mixtures of ethylene or butylene radicals with propylene radicals, the amount of ethylene or butylene radicals relative to the propylene radicals being such that the ratio of carbon atoms to oxygen atoms in the total $+OR+$ block ranges from 2.0/1 to 2.9/1, which siloxane-polyoxyalkylene copolymer is prepared by the process which consists essentially of reacting a dihydroxy functional linear dimethylpolysiloxane with a dihydroxy functional polyoxyalkylene polymer, wherein the hydroxy groups on the polyoxyalkylene polymer are primary hydroxyl groups and where the mole ratio of the hydroxy on the polyoxyalkylene polymer to the hydroxy on the linear dimethylpolysiloxane is 2:1 to 0.5:1, in a solvent solution at 40–75 percent solids based on the total weight of the dimethylpolysiloxane, polyoxyalkylene polymer and solvent, in the presence of a non-rearranging acid condensation catalyst at a temperature of 80°–130° C. for a period of 3–15 hours, (II) curing the urethane polymer whereby the siloxane polyoxyalkylene copolymer is reacted into the urethane polymer, thereby modifying the physical properties of the urethane polymer.

2. A method as claimed in claim 1 wherein $+OR+$ is $+OCH_2CH_2+$, $x$ has an average value of 13.5 and $y$ has an average value of 31.

3. A method as claimed in claim 1 wherein $+OR+$ is $+OCH_2CH_2+$, $x$ has an average value of 13.5, and $y$ has an average value of 50.

4. A method as claimed in claim 1 wherein $+OR+$ is a copolymer of polyoxyethylene and polyoxypropylene, the ratio of carbon atoms to oxygen atoms in the total $+OR+$ block is 2.9/1, $x$ has an average value of 37, $y$ has an average value of 50.

5. A method as claimed in claim 1 wherein $+OR+$ is $+OCH_2CH_2)$, $x$ has an average value of 9, $y$ has an average value of 100.

6. A method as claimed in claim 1 wherein $+OR+$ is $+OCH_2CH_2$, $x$ has an average value of 13.5 and $y$ has an average value of 60.

7. A composition of matter which consists of (A) a curable urethane elastomer; (B) from 5.1 to 36 weight percent based on the weight of the total composition, of a siloxane-polyoxyalkylene copolymer selected from the group consisting of

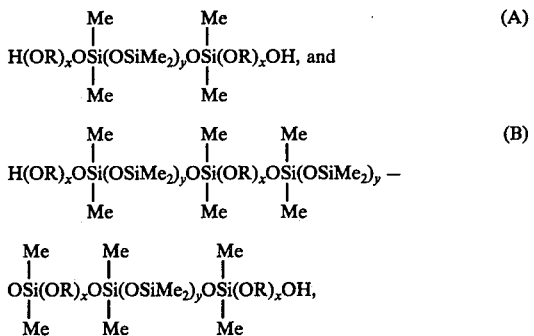

wherein each $x$ has an average value of 3 to 45, each $y$ has an average value of 8 to 198, Me is a methyl radical, wherein $+OR+_x$ is a polyoxyalkylene polymer or copolymer wherein R is composed of ethylene radicals or butylene radicals and mixtures of ethylene or butylene radicals with propylene radicals, the amount of ethylene or butylene radicals relative to the propylene radicals being such that the ratio of carbon atoms to oxygen atoms in the total $+OR+_x$ block ranges from 2.0/1 to 2.9/1, which siloxane-polyoxyalkylene copolymer is prepared by the process which consists essentially of reacting a dihydroxy functional linear dimethylpolysiloxane with a dihydroxy functional polyoxyalkylene polymer, wherein the hydroxy groups on the polyoxyalkylene polymer are primary hydroxyl groups and where the mole ratio of the hydroxy on the polyoxyalkylene polymer to the hydroxy on the linear dimethylpolysiloxane is 2:1 to 0.5:1, in a solvent solution at 40–75 percent solids based on the total weight of the dimethylpolysiloxane, polyoxyalkylene polymer and solvent, in the presence of a non-rearranging acid condensation catalyst at a temperature of 80°–130° C. for a period of 3–15 hours.

8. A composition of matter as claimed in claim 7 wherein R is ethylene, $x$ has an average value of 13.5 and $y$ has an average value of 50.

9. The method as claimed in claim 1 wherein (A) containing (B) is cured at room temperature.

10. The method as claimed in claim 1 wherein (A) containing (B) is cured at a temperature above room temperature.

11. A composition of matter which consists of (A) a cured urethane elastomer containing therein (B) from 5.1 to 36 weight percent based on the weight of the total composition, of a siloxane-polyoxyalkylene copolymer selected from the group consisting of

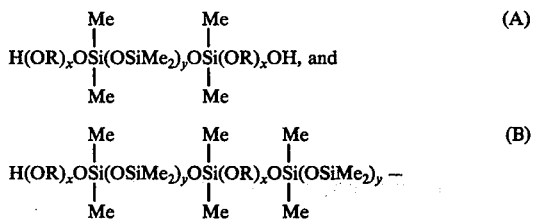

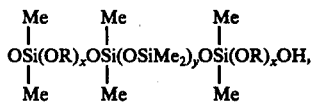

wherein each $x$ has an average value of 3 to 45, each $y$ has an average value of 8 to 198, Me is a methyl radical, wherein $\text{+OR+}_x$ is a polyoxyalkylene polymer or copolymer wherein R is composed of ethylene radicals or butylene radicals and mixtures of ethylene or butylene radicals with propylene radicals, the amount of ethylene or butylene radicals relative to the propylene radicals being such that the ratio of carbon atoms to oxygen atoms in the total $\text{+OR+}$ block ranges from 2.0/1 to 2.9/1, which siloxane-polyoxyalkylene copolymer is prepared by the process which consists essentially of reacting a dihydroxy functional linear dimethylpolysiloxane with a dihydroxy functional polyoxyalkylene polymer, wherein the hydroxy groups on the polyoxyalkylene polymer are primary hydroxyl groups and where the mole ratio of the hydroxy on the polyoxyalkylene polymer to the hydroxy on the linear dimethylpolysiloxane is 2:1 to 0.5:1, in a solvent solution at 40–75 percent solids based on the total weight of the dimethylpolysiloxane, polyoxyalkylene polymer and solvent, in the presence of a non-rearranging acid condensation catalyst at a temperature of 80°–130° C. for a period of 3–15 hours.

12. A composition of matter as claimed in claim 11 wherein R is ethylene, $x$ has an average value of 13.5 and $y$ has an average value of 50.

13. A composition as claimed in claim 7 wherein the urethane elastomer is a Spandex fiber.

14. A method as claimed in claim 1 wherein the uncured urethane elastomer is a Spandex fiber formulation.

* * * * *

UNITED STATES PATENT AND TRADEMARK OFFICE
CERTIFICATE OF CORRECTION

PATENT NO. : 4,057,595

DATED : November 8, 1977

INVENTOR(S) : Lawrence A. Rauner; Joseph A. Colquhoun

It is certified that error appears in the above-identified patent and that said Letters Patent are hereby corrected as shown below:

In Column 5, line 36; the word "polyesters" should read "polyethers".

In Column 6, line 50; the word "Plutonic" should read "Pluronic".

In Column 12, line 2; the formula "{$OCH_2CH_2$, x" should read "{$OCH_2CH_2$}, x".

Signed and Sealed this

Eighth Day of September 1981

[SEAL]

Attest:

GERALD J. MOSSINGHOFF

Attesting Officer    Commissioner of Patents and Trademarks